(12) United States Patent
Tzou

(10) Patent No.: US 12,505,738 B2
(45) Date of Patent: Dec. 23, 2025

(54) SYSTEM FOR CONTROLLING TRAFFIC SIGNAL AND METHOD THEREOF

(71) Applicant: LEOTEK CORPORATION, Taipei (TW)

(72) Inventor: Heng-An Tzou, Taipei (TW)

(73) Assignee: LEOTEK CORPORATION, Taipei (TW)

(*) Notice: Subject to any disclaimer, the term of this patent is extended or adjusted under 35 U.S.C. 154(b) by 44 days.

(21) Appl. No.: 18/794,648

(22) Filed: Aug. 5, 2024

(65) Prior Publication Data

US 2025/0378757 A1 Dec. 11, 2025

(30) Foreign Application Priority Data

Jun. 7, 2024 (TW) ................. 113121233

(51) Int. Cl.
*G08G 1/08* (2006.01)
*G06N 3/092* (2023.01)
*G06V 20/54* (2022.01)
*G08G 1/095* (2006.01)

(52) U.S. Cl.
CPC ............ *G08G 1/08* (2013.01); *G06N 3/092* (2023.01); *G06V 20/54* (2022.01); *G08G 1/095* (2013.01); *G06V 2201/08* (2022.01)

(58) Field of Classification Search
CPC .......... G08G 1/08; G08G 1/095; G06N 3/092; G06V 20/54; G06V 2201/08
See application file for complete search history.

(56) References Cited

U.S. PATENT DOCUMENTS

| | | | |
|---|---|---|---|
| 10,133,275 B1* | 11/2018 | Kobilarov | B60W 30/09 |
| 2019/0057314 A1* | 2/2019 | Julian | H04L 67/34 |
| 2020/0017117 A1* | 1/2020 | Milton | G06N 3/09 |
| 2020/0074266 A1* | 3/2020 | Peake | G06F 18/2411 |
| 2021/0241616 A1* | 8/2021 | Abdulhai | G08G 1/052 |
| 2022/0198925 A1 | 6/2022 | Alizadeh | |

FOREIGN PATENT DOCUMENTS

| | | | |
|---|---|---|---|
| CN | 106910351 B | 10/2019 | |
| CN | 111243271 A | 6/2020 | |
| CN | 112700664 A | 4/2021 | |
| CN | 110047278 B | 6/2021 | |
| CN | 117409593 A | 1/2024 | |
| IN | 202111005979 A | 10/2021 | |
| WO | WO-2019145018 A1 * | 8/2019 | ........... G08G 1/0116 |

* cited by examiner

*Primary Examiner* — Rufus C Point
(74) *Attorney, Agent, or Firm* — WPAT, PC

(57) ABSTRACT

A method for controlling traffic signal provided by the present disclosure, comprises: obtaining an intersection image; identifying types of multiple objects in the intersection image; counting the types of the multiple objects, to generate at least one vehicle position layer, a pedestrian layer and an object speed layer corresponding to the types of the multiple objects; encoding the foresaid multiple layers, to respectively generate multiple encodings; inputting the foresaid multiple encodings to a reinforcement learning (RL) model; and the RL model determining a phase of the traffic signal according to the input foresaid multiple encodings.

20 Claims, 12 Drawing Sheets

SYSTEM FOR CONTROLLING TRAFFIC SIGNAL AND METHOD THEREOF

This application claims the benefit of Taiwan application Serial No. 113121233, filed Jun. 7, 2024, the subject matter of which is incorporated herein by reference.

TECHNICAL FIELD

The disclosure relates in general to a system for controlling traffic signal, and more particularly, to a method for controlling traffic signal.

BACKGROUND

The current traffic control system generally relies on a predetermined time table or requires a high-cost induction coil requiring to be installed by digging the road, for adjusting the phase change of traffic signals (such as green or red lights). By this mean, it cannot effectively deal complicated or fluctuated traffic conditions. Thus, in order to improve the complicated traffic conditions, such as in cities, there are needs for optimizing the strategy of switching phase of traffic signals based on intersection conditions in real-time.

SUMMARY

The present disclosure describes techniques of system and method for controlling traffic signal, which optimize for controlling the phase of the traffic signal in the intersection by using reinforcement learning (RL) model.

The first aspect of the present disclosure features a method for controlling traffic signal. The method comprises obtaining an intersection image. The method also comprises identifying types of a plurality of objects in the intersection image. The method also comprises counting the types of the plurality of objects, to generate at least one vehicle position layer, a pedestrian position layer and an object speed layer, corresponding to the types of the plurality of objects. The object speed layer corresponds to speeds of corresponded objects in the at least one vehicle position layer and the pedestrian position layer. The method also comprises encoding the at least one vehicle position layer, the pedestrian position layer and the object speed layer, to respectively generate a vehicle position encoding, a pedestrian position encoding and an object speed encoding. The method also comprises inputting the vehicle position encoding, the pedestrian position encoding and the object speed encoding to a reinforcement learning, RL, model. The method also comprises determining, by the RL model, a phase of the traffic signal according to the input of the vehicle position encoding, the pedestrian position encoding and the object speed encoding.

According to some implementations of the first aspect of the present disclosure, the types of the plurality of objects identified in the intersection image, include large vehicles and small vehicles, and counting the types of the plurality of objects includes counting the large vehicles and the small vehicles, to respectively generate a large vehicle position layer and a small vehicle position layer of the at least one vehicle position layer.

According to some implementations of the first aspect of the present disclosure, encoding the at least one vehicle position layer comprises encoding the large vehicle position layer and the small vehicle position layer are encoded, to respectively generate a large vehicle position encoding and a small vehicle position encoding. Inputting the vehicle position encoding to the RL model comprises inputting the large vehicle position encoding and the small vehicle position encoding. The RL model determines a phase of the traffic signal according to the input of the large vehicle position encoding, the small vehicle position encoding, the pedestrian position encoding and the object speed encoding.

According to some implementations of the first aspect of the present disclosure, counting the types of the plurality of objects to the object speed layer corresponding to the types of the plurality of objects comprises using a plurality of vectors for respectively representing positions and moving speeds of a plurality of corresponded moving objects in the intersection image.

According to some implementations of the first aspect of the present disclosure, obtaining the intersection image comprises shooting a plurality of images by a plurality of camera units disposed on an intersection environment, and stitching the plurality of images to obtain the intersection image.

According to some implementations of the first aspect of the present disclosure, obtaining the intersection image comprises shooting a panoramic image by a camera unit disposed on an intersection environment, and sectioning the intersection image from the panoramic image.

According to some implementations of the first aspect of the present disclosure, identifying the types of the plurality of objects in the intersection image comprises, according to preset object areas, identifying the types of the plurality of objects from each object area, in the intersection image.

According to some implementations of the first aspect of the present disclosure, encoding the at least one vehicle position layer and the pedestrian position layer is encoding based on a plurality of positions in the at least one vehicle position layer and the pedestrian position layer corresponding to the plurality of objects.

According to some implementations of the first aspect of the present disclosure, the method further comprises obtaining an updated intersection image based on a period of the phase of the traffic signal being determined. The method also comprises identifying the types of the plurality of objects in the updated intersection image. The method also comprises counting the types of the plurality of objects, to generate at least one updated vehicle position layer, an updated pedestrian position layer and an updated object speed layer, corresponding to the types of the plurality of objects. The updated object speed layer corresponds to speeds of corresponded objects in the at least one updated vehicle position layer and the updated pedestrian position layer. The method also comprises encoding the at least one updated vehicle position layer, the updated pedestrian position layer and the updated object speed layer, to respectively generate an updated vehicle position encoding, an updated pedestrian position encoding and an updated object speed encoding. The method also comprises inputting the updated vehicle position encoding, the updated pedestrian position encoding and the updated object speed encoding to the RL model. The method also comprises determining, by the RL model, an updated phase of the traffic signal according to the input of the updated vehicle position encoding, the updated pedestrian position encoding and the updated object speed encoding.

According to some implementations of the first aspect of the present disclosure, the phase and the updated phase of the traffic signal comprise a pedestrian traffic signal phase and a vehicle traffic signal phase.

The second aspect of the present disclosure features a system for controlling traffic signal. The system comprises an image acquiring module, configured to obtain an intersection image. The system also comprises an image analyze module, configured to identify types of a plurality of objects in the intersection image, and configured to count the types of the plurality of objects, to generate at least one vehicle position layer, a pedestrian position layer and an object speed layer, corresponding to the types of the plurality of objects. The object speed layer corresponds to speeds of corresponded objects in the at least one vehicle position layer and the pedestrian position layer. The system also comprises a layer encoding module, configured to encode the at least one vehicle position layer, the pedestrian position layer and the object speed layer, to respectively generate a vehicle position encoding, a pedestrian position encoding and an object speed encoding. The system also comprises a RL model, configured to receive the vehicle position encoding, the pedestrian position encoding and the object speed encoding, and configured to determine a phase of the traffic signal according to receiving of the vehicle position encoding, the pedestrian position encoding and the object speed encoding.

According to some implementations of the second aspect of the present disclosure, the image analyze module identifies the types of the plurality of objects in the intersection image including large vehicles and small vehicles, and counts the large vehicles and the small vehicles in the intersection image, to respectively generate a large vehicle position layer and a small vehicle position layer of the at least one vehicle position layer.

According to some implementations of the second aspect of the present disclosure, the layer encoding module encoding the at least one vehicle position layer, comprises encoding the large vehicle position layer and the small vehicle position layer are encoded, to respectively generate a large vehicle position encoding and a small vehicle position encoding. The RL model receiving the vehicle position encoding, comprises receiving the large vehicle position encoding and the small vehicle position encoding. The RL model determines a phase of the traffic signal according to receiving of the large vehicle position encoding, the small vehicle position encoding, the pedestrian position encoding and the object speed encoding.

According to some implementations of the second aspect of the present disclosure, the image analyze module counting the types of the plurality of objects to the object speed layer corresponding to the types of the plurality of objects, comprises using a plurality of vectors for respectively representing positions and moving speeds of a plurality of corresponded moving objects in the intersection image.

According to some implementations of the second aspect of the present disclosure, the image acquiring module obtaining the intersection image, comprises shooting a plurality of images by a plurality of camera units disposed on an intersection environment, and stitching the plurality of images to obtain the intersection image.

According to some implementations of the second aspect of the present disclosure, the image acquiring module obtaining the intersection image, comprises shooting a panoramic image by a camera unit disposed on an intersection environment, and sectioning the intersection image from the panoramic image.

According to some implementations of the second aspect of the present disclosure, the image analyze module identifying the types of the plurality of objects in the intersection image, comprises, according to preset object areas, identifying the types of the plurality of objects from each object area, in the intersection image.

According to some implementations of the second aspect of the present disclosure, the layer encoding module encoding the at least one vehicle position layer and the pedestrian position layer is encoding based on a plurality of positions in the at least one vehicle position layer and the pedestrian position layer corresponding to the plurality of objects.

According to some implementations of the second aspect of the present disclosure, the image acquiring module is configured to obtain an updated intersection image based on a period of the phase of the traffic signal being determined. The image analyze module is configured to identify the types of the plurality of objects in the updated intersection image, and is configured to count the types of the plurality of objects, to generate at least one updated vehicle position layer, an updated pedestrian position layer and an updated object speed layer, corresponding to the types of the plurality of objects. The updated object speed layer corresponds to speeds of corresponded objects in the at least one updated vehicle position layer and the updated pedestrian position layer. The layer encoding module is configured to encode the at least one updated vehicle position layer, the updated pedestrian position layer and the updated object speed layer, to respectively generate an updated vehicle position encoding, an updated pedestrian position encoding and an updated object speed encoding. The RL model is configured to receive the updated vehicle position encoding, the updated pedestrian position encoding and the updated object speed encoding, and is configured to determine an updated phase of the traffic signal according to receiving of the updated vehicle position encoding, the updated pedestrian position encoding and the updated object speed encoding.

According to some implementations of the second aspect of the present disclosure, the phase and the updated phase of the traffic signal determined by the RL model comprise a pedestrian traffic signal phase and a vehicle traffic signal phase.

Implementations of the above techniques include methods, systems, circuits, computer program products and computer-readable media. In one example, a method can include the above-described actions. In another example, one such computer program product is suitably embodied in a non-transitory machine-readable medium that stores instructions executable by one or more processors. The instructions are configured to cause the one or more processors to perform the above-described actions. One such computer-readable medium stores instructions that, when executed by one or more processors, are configured to cause the one or more processors to perform the above-described actions.

The details of one or more disclosed implementations are set forth in the accompanying drawings and the description below. Other features, aspects, and advantages will become apparent from the description, the drawings and the claims.

Figure 1:
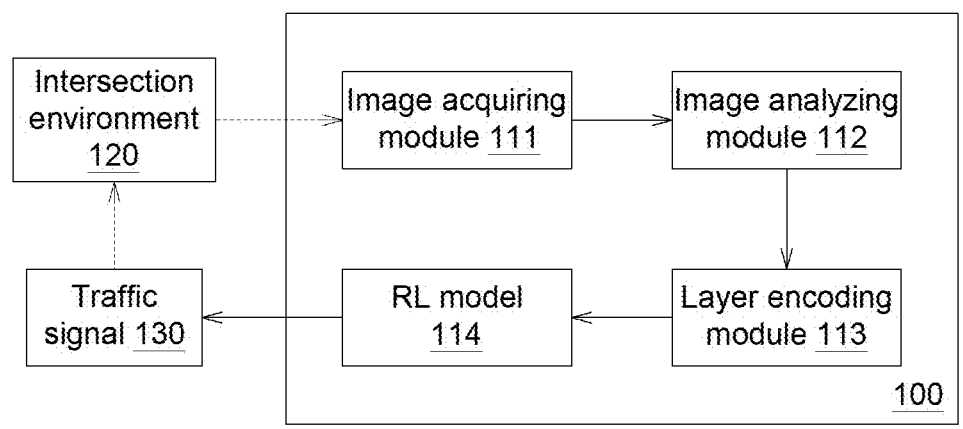
FIG. 1 is a diagram illustrating an example system, according to one or more implementations of the present application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

According to the techniques in some implementations of present disclosure, a system and a method for controlling traffic signal are provided. These techniques can be implemented basing on deep reinforcement learning (Deep RL), such as through a reinforcement learning (RL) model, which, by observing the intersection environment in real-time and executing actions according to the observed results, obtains rewards for learning (or be trained) the most preferred action, to optimize the strategy for controlling and switching phases of traffic signals.

Figure 3:
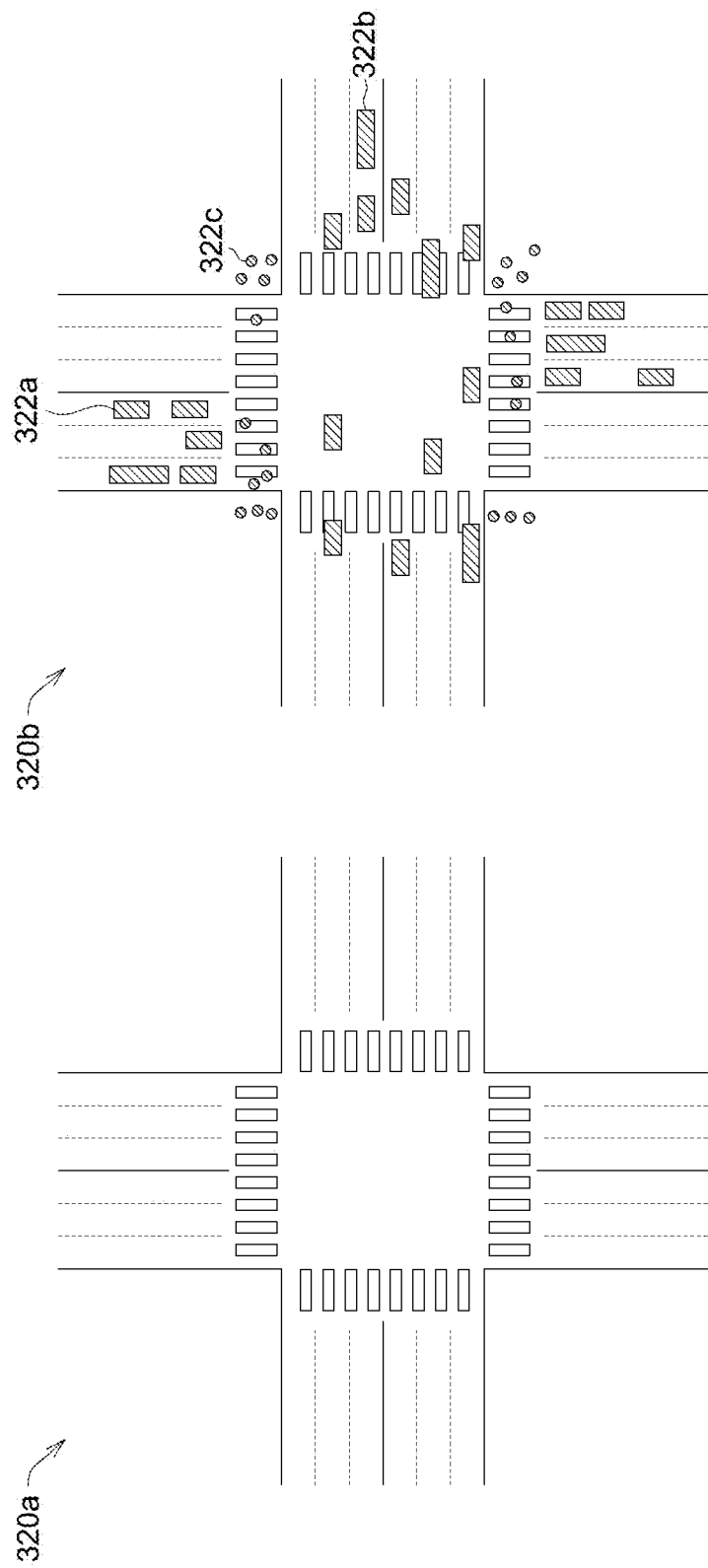
FIG. 3 is a diagram illustrating an intersection environment and an intersection image, according to one or more implementations of the present application.

FIG. 1 is a diagram illustrating an example system, according to one or more implementations of the present application. The system 100 comprises an image acquiring module 111 configured to obtain an intersection image from an intersection environment 120. In some implementations, the image acquiring module 111 can receive multiple images captured by multiple camera units disposed the intersection environment 120, and stitch the multiple images to obtain the intersection image. In some implementations, the image acquiring module 120 can receive a panoramic image shoot by single camera unit disposed on the intersection environment 120, and section the intersection image from the panoramic image. The system 100 comprises an image analyze module 112 configured to identify types of objects in the intersection image, which the types of objects include different types or sizes of vehicles, and pedestrians, for example, as shown in FIG. 3, objects 322a and objects 322b are vehicles, and objects 322c are pedestrians. The image analyze module 112 then counts vehicles or pedestrian of multiple types of objects to generate multiple layers corresponding to the multiple types of objects, for example, at least one vehicle position layer, a pedestrian position layer and an object speed layer, of vehicles and pedestrian (such as layer 413a, 413b and 413c of FIGS. 4A to 4C, and layer 613d of FIG. 6). The object speed layer (such as layer 613d of FIG. 6) corresponds to speeds of corresponded objects (such as objects 622d of FIG. 6) in the at least one vehicle position layer (such as layers 413a and 413b of FIGS. 4A to 4B) and the pedestrian position layer (such as layer 413c FIG. 4C). Theses layers will be detailed described referring to FIGS. 4A to 6 as following. In some implementations, the image analyze module 112 can be implemented by artificial intelligent (AI) techniques, to identify and count objects in the intersection image, for example, by AI detection techniques such as YOLO (You Only Look Once) or A-Z. The system 100 also comprises a layer encoding module 113 configured to encode the at least one vehicle position layer, the pedestrian position layer and the object speed layer, to generate a vehicle position encoding, a pedestrian position encoding and an object speed encoding. In some implementations, the encoding corresponding to object position layers (such as vehicle position layer and the pedestrian position layer) can be based on positions of objects in the layers correspondingly, for example but not limited to, positions of objects in the layer can be represented by "1", and otherwise positions without objects in the layer can be represented by "0", such as based on layer 413a, layer 413b and layer 413c of FIGS. 4A to 4C. In some implementations, the encoding corresponding to the object speed layer, can be based on moving vectors of objects in the layers, such as layer 613d of FIG. 6, but not limited to. The system 100 also comprises a RL model 114 configured to receive the vehicle position encoding, the pedestrian position encoding and the object speed encoding. The RL model 114 is also configured to determine a phase of the traffic signal (such as vehicle traffic signal phases 723a-723i or pedestrian traffic signal phases 724a-723h) according to inputs of the vehicle position encoding, the pedestrian position encoding and the object speed encoding, and to control the traffic signal 130 to display those phases. Theses phases will be detailed described referring to FIGS. 7A and 7B as following.

Figure 2:
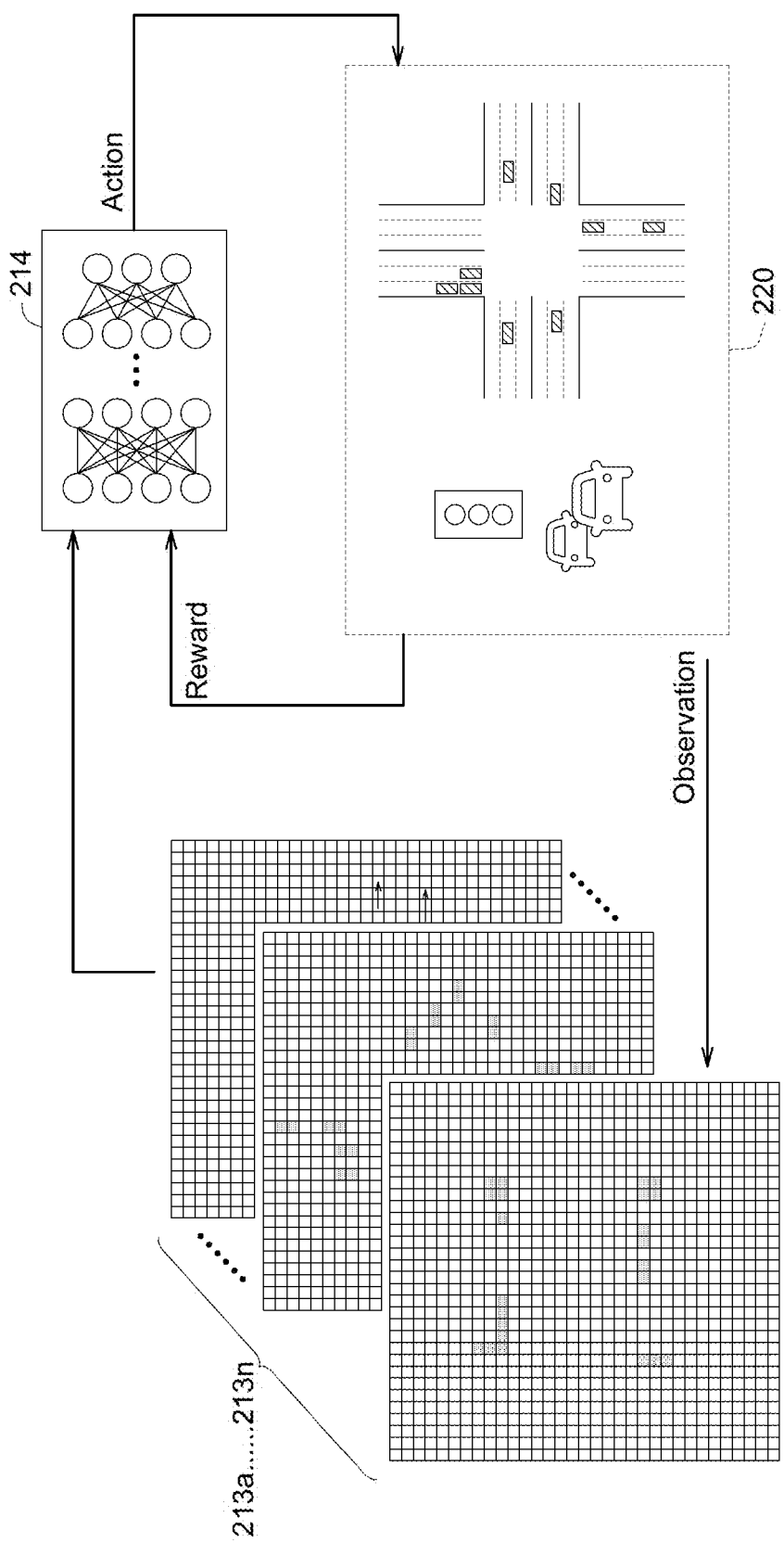
FIG. 2 is a diagram illustrating an example processing mechanism, according to one or more implementations of the present application.

FIG. 2 is a diagram illustrating an example processing mechanism, according to one or more implementations of the present application. As shown by FIG. 2, RL model 214 (similar to RL model 114 of FIG. 1) can also be referred as deep RL agent, which can be implemented as a core of neural networks, to interact with the intersection environment 220. By observing the intersection environment 220 and through the analyzing and counting the intersection image as discussed above, layers 213a-213n can be generated to complete the cycle process of action and rewards. Due to the RL model 214, the traffic can be smartly controlled by analyzing the intersection image including identifying vehicles and pedestrians in the intersection image, in real-time, and dynamically determining the phase of traffic signal according to actual traffic status, to decrease traffic jam, increase efficiency for road usage, and ensure the safety of vehicle driving or pedestrian crossing.

FIG. 3 is a diagram illustrating an intersection environment 320a and an intersection image 320b, according to one or more implementations of the present application. As shown in FIG. 3, the intersection environment 320a includes pedestrian crosswalks and vehicle driving lanes. As shown by the actual intersection image 320b, the intersection environment may include multiple types of objects, such as objects 322a, objects 322b and objects 322c. In this case, objects 322a and objects 322b respectively indicate different sizes of vehicles, and the objects 322c indicate pedestrians. For purposes of briefly explanation, in FIG. 3, FIGS. 4A to 4C and FIG. 6, the same types of objects are represented by similar shapes instead of marking all same types with notations.

Figure 4A:
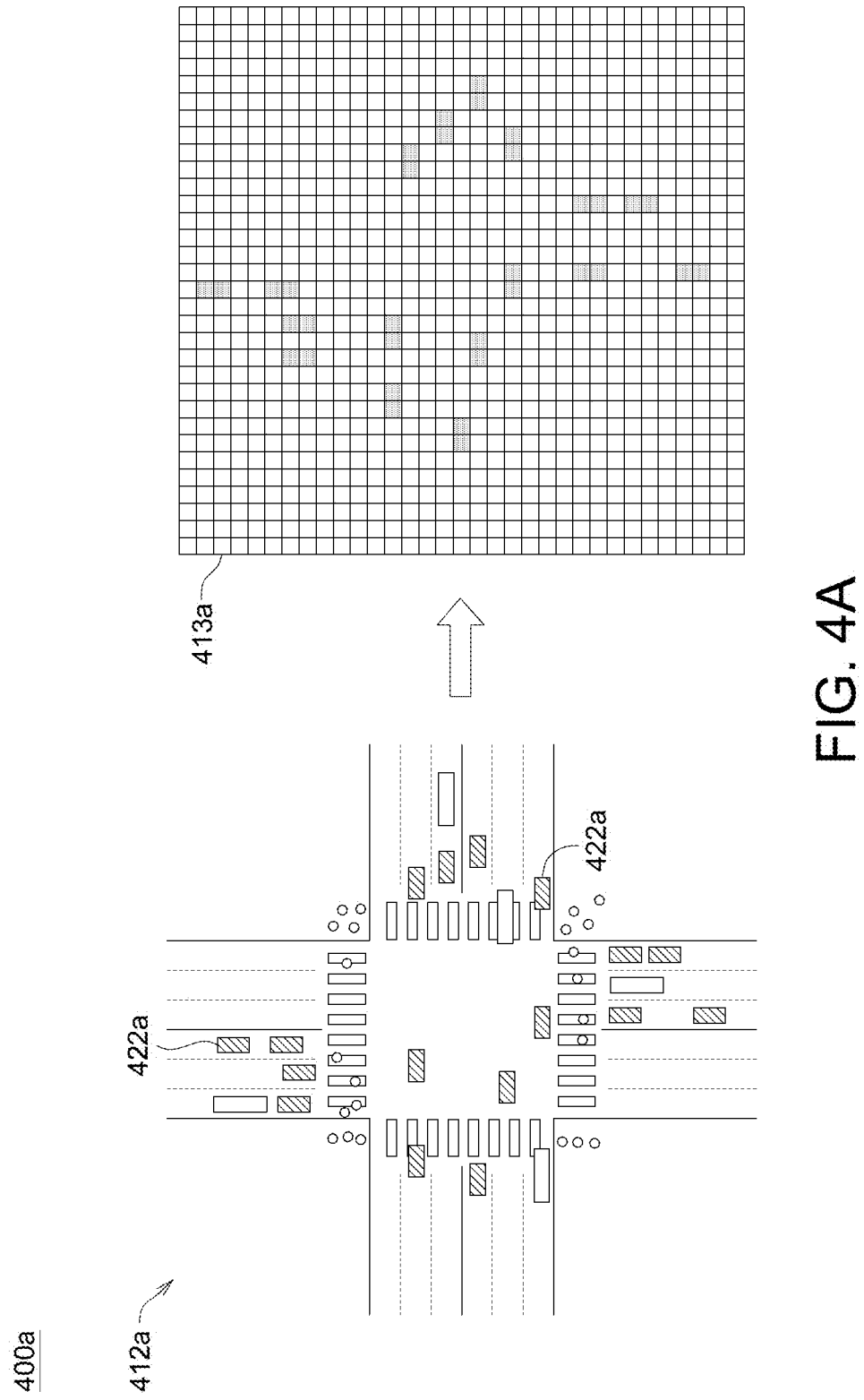
FIGS. 4A to 4C are a diagrams illustrating example counting and encoding for object positions in the intersection image, according to one or more implementations of the present application.
Figure 4B:
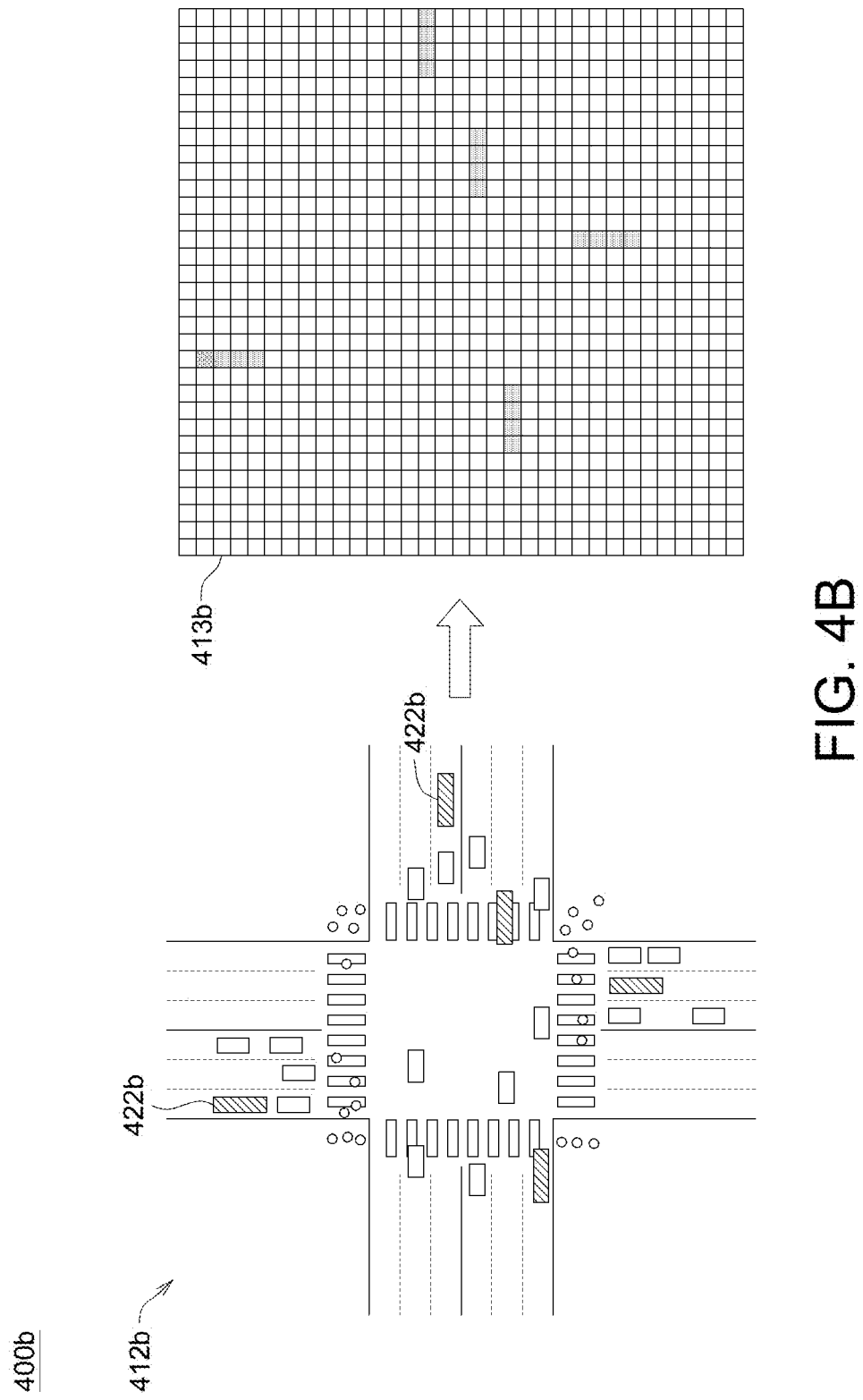
Figure 4C:
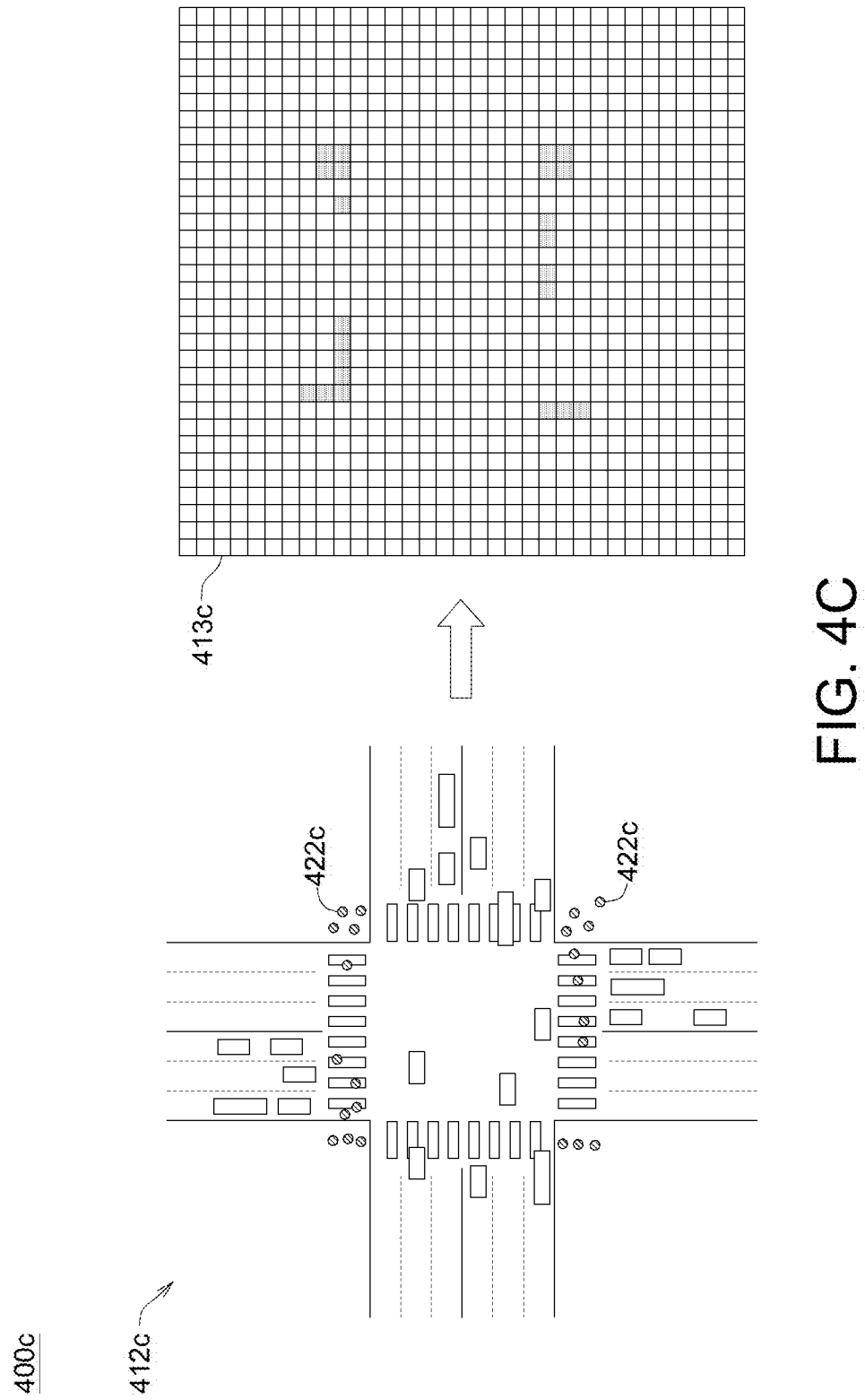

FIGS. 4A to 4C are a diagrams illustrating example counting and encoding 400a-400c for object positions in the intersection image, according to one or more implementations of the present application. As discussed above, according to the actual intersection image (such as the intersection image 320b of FIG. 3), the types of objects therein (such as objects 322a, objects 322b and objects 322c) can be analyzed and counted, to generate corresponding layers (such as by the image analyze module 112 of FIG. 1), then the layers can be encoded (such as by the layer encoding module 113 of FIG. 1). In the case of FIG. 4A, after identifying and counting the objects (such as by the image analyze module 112 of FIG. 1) in the intersection image (such as intersection image 320b of FIG. 3), the identifying and counting result 412a of objects 422a (similar to objects 322a of FIG. 3) can be obtained. In the identifying and counting result 412a, objects 422a are small vehicles as for example, and other objects being identical to objects 422a, are also represented by same plastered rectangles. Based on the identifying and counting result 412a, the layer 413a can be further generated to represent the corresponding position of objects 422a in the intersection image. Then, layer 413a related to positions of small vehicles, can be encoded (such as by the layer encoding module 113 of FIG. 1), to correspondingly generate a small vehicle position encoding, which can be provided to input to a RL model (such as the RL model 114 of FIG. 1 or the RL model 214 of FIG. 2).

Similarly, in the case of FIG. 4B, after identifying and counting the objects (such as by the image analyze module 112 of FIG. 1) in the intersection image (such as intersection image 320b of FIG. 3), the identifying and counting result 412b of objects 422b (similar to objects 322b of FIG. 3) can be obtained. In the identifying and counting result 412b, objects 422b are large vehicles as for example, and other objects being identical to objects 422b, are also represented by same plastered rectangles. Based on the identifying and counting result 412b, the layer 413b can be further generated to represent the corresponding position of objects 422b in the intersection image. Then, layer 413b related to positions of large vehicles, can be encoded (such as by the layer encoding module 113 of FIG. 1), to correspondingly generate a large vehicle position encoding, which can be provided to input to a RL model (such as the RL model 114 of FIG. 1 or the RL model 214 of FIG. 2).

Similarly, in the case of FIG. 4C, after identifying and counting the objects (such as by the image analyze module 112 of FIG. 1) in the intersection image (such as intersection image 320b of FIG. 3), the identifying and counting result 412c of objects 422c (similar to objects 322c of FIG. 3) can be obtained. In the identifying and counting result 412c, objects 422c are pedestrians as for example, and other objects being identical to objects 422c, are also represented by same plastered circles. Based on the identifying and counting result 412c, the layer 413c can be further generated to represent the corresponding position of objects 422c in the intersection image. Then, layer 413a related to positions of pedestrians, can be encoded (such as by the layer encoding module 113 of FIG. 1), to correspondingly generate a pedestrian position encoding, which can be provided to input to a RL model (such as the RL model 114 of FIG. 1 or the RL model 214 of FIG. 2).

Figure 5:
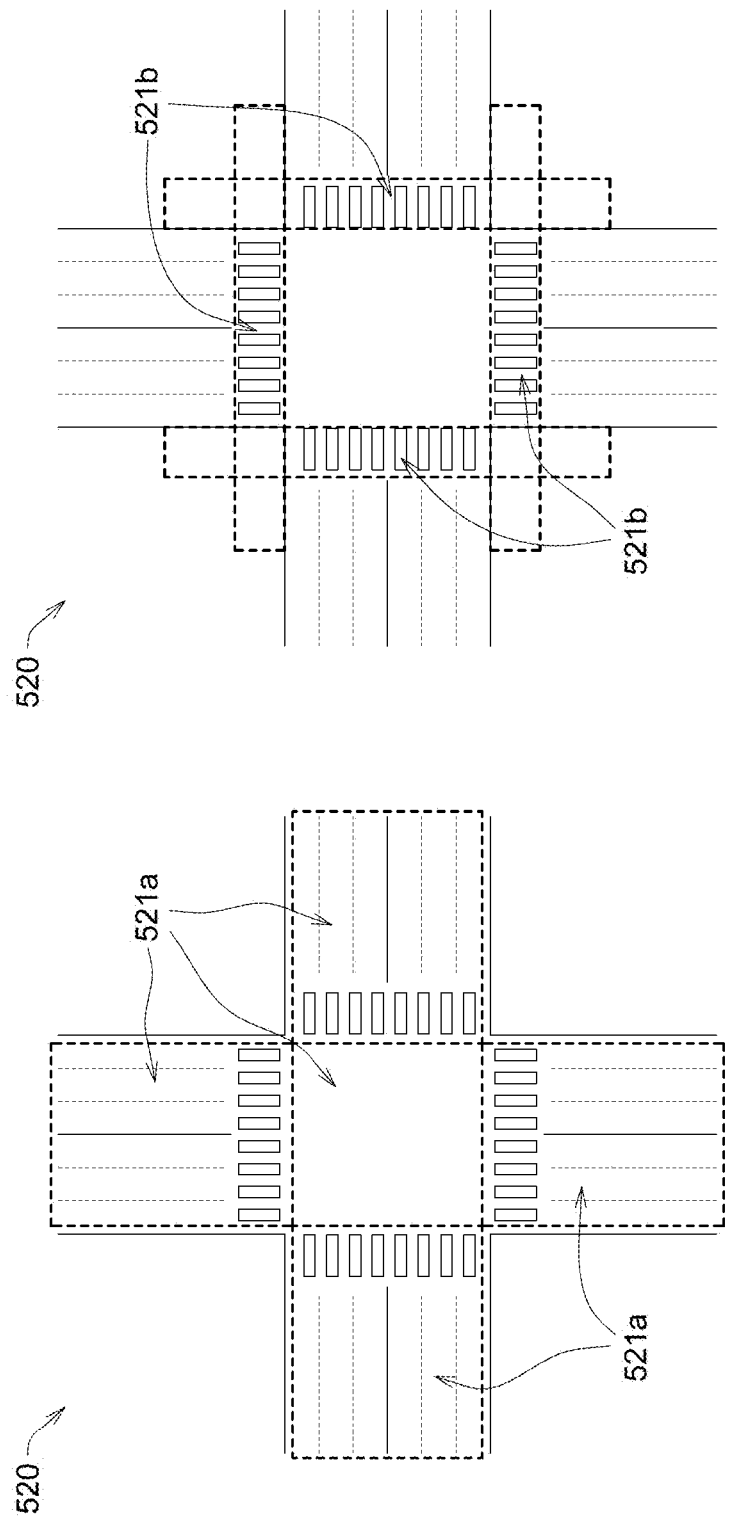
FIG. 5 is a diagram illustrating example object areas in the intersection environment, according to one or more implementations of the present application.

FIG. 5 is a diagram illustrating example object areas 521a and 521b in the intersection environment 520, according to one or more implementations of the present application. In some implementations, an image analyze module, such as the image analyze module 112 of FIG. 1, can identify types of objects corresponding to those object areas in the intersection image according to preset multiple object areas, such as object area 521a and object area 521b of FIG. 5. In this case, the object area 521a mainly covers vehicle driving lanes, and the object area 521b mainly covers pedestrian sidewalks and crosswalks. In other words, the image analyze module can analyze and identify objects in the intersection image are vehicles or pedestrians according to the object areas are vehicle driving lanes or pedestrian sidewalks and crosswalks, which can increase the accuracy of identifying types of objects.

Figure 6:
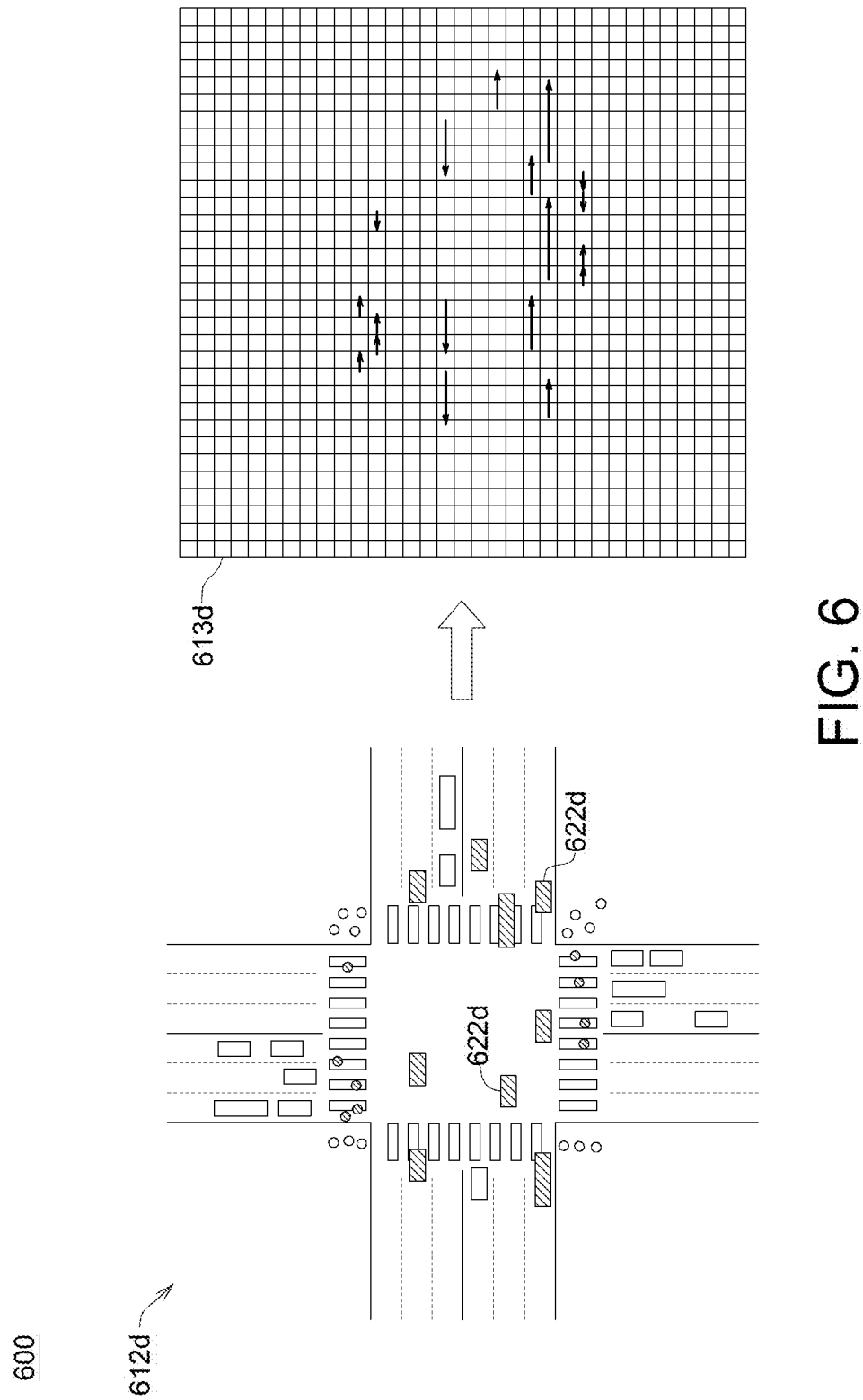
FIG. 6 is a diagram illustrating example counting and encoding for object speeds in the intersection image, according to one or more implementations of the present application.

FIG. 6 is a diagram illustrating example counting and encoding for object speeds in the intersection image, according to one or more implementations of the present application. In the case of FIG. 6, after identifying and counting the objects (such as by the image analyze module 112 of FIG. 1) in the intersection image (such as intersection image 320b of FIG. 3), the identifying and counting result 612d of moving objects 622d can be obtained. In the identifying and counting result 612d, moving objects 622d include moving (with speed) small vehicles, large vehicles and pedestrians as for example, and other moving objects similar to moving objects 622d, are also represented by same plastered rectangles and cycles. Based on the identifying and counting result 612d, the layer 613d can be further generated, and vectors are used to represent the corresponding position and moving speed of mobbing objects 622d in the intersection image. Then, layer 613d related to moving speed of moving objects, can be encoded (such as by the layer encoding module 113 of FIG. 1), to correspondingly generate an object speed encoding, which can be provided to input to a RL model (such as the RL model 114 of FIG. 1 or the RL model 214 of FIG. 2).

In some implementations, the RL model can determine a phase of the traffic signal according to foresaid input of multiple vehicle position encodings, the pedestrian position encoding and the object speed encoding. In some implementations, types of objects can include more types of vehicles, such as motorbikes or vehicles with other sizes, or merely include vehicle or pedestrians, which is not limited to all the types of objects discussed herein.

Figure 7A:
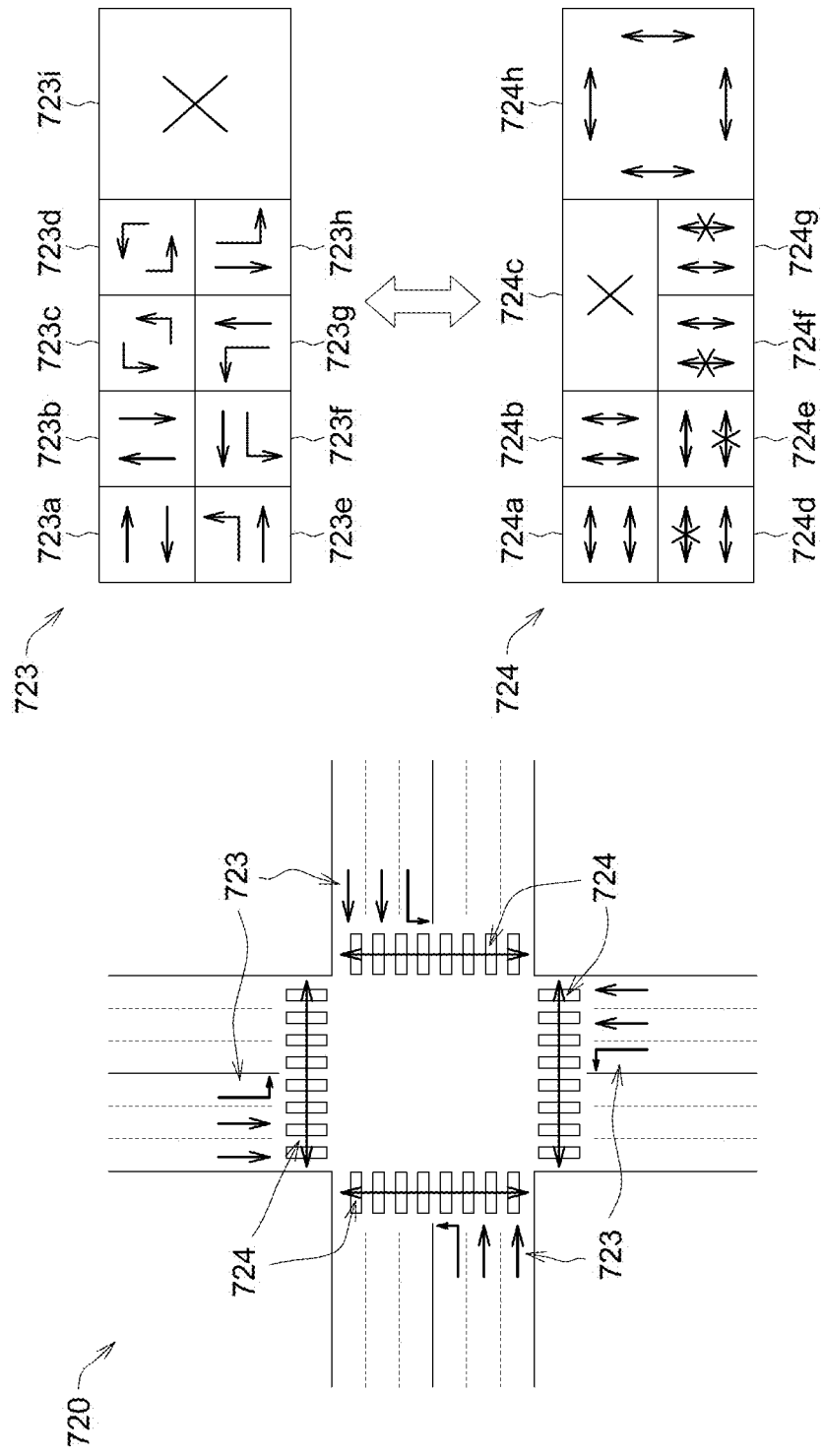
FIGS. 7A and 7B are diagrams illustrating example vehicle traffic signals, and example pedestrian traffic signals with corresponding example vehicle traffic signal phases and pedestrian traffic signal phases, according to one or more implementations of the present application.
Figure 7B:
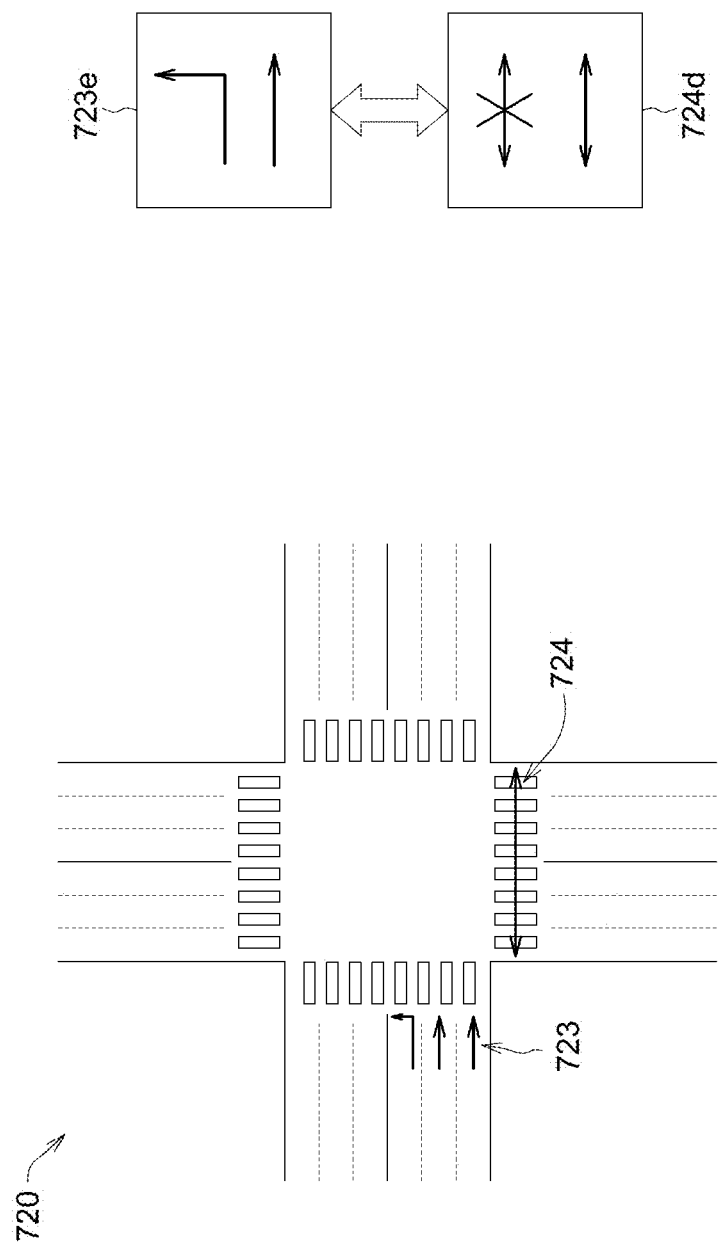

FIGS. 7A and 7B are diagrams illustrating example vehicle traffic signals 723, and example pedestrian traffic signals 724 with corresponding example vehicle traffic signal phases 723a-723i and pedestrian traffic signal phases 724a-724h, according to one or more implementations of the present application. The intersection environment 720 includes vehicle traffic signals 723 and pedestrian traffic signals 724, to indicate vehicles or pedestrians to pass or not pass in different directions. The vehicle traffic signals 723 include vehicle traffic signal phases 723a-723i. Vehicle traffic signal phases 723a-723i may, for example, include straight forward in two ways (such as vehicle traffic signal phases 723a and 723b), straight forward and turning left in one way (such as vehicle traffic signal phases 723e-723h), turning left in two ways (such as vehicle traffic signal phases 723c and 723d) and all stop (such as vehicle traffic signal phase 723i). Pedestrian traffic signals 724 include pedestrian traffic signal phases 724a-724h. Pedestrian traffic signal phases 724a-724h may, for example, include pass on two side (such as pedestrian traffic signal phases 724a and 724b), pass on one side (such as pedestrian traffic signal phases 724d-724g), all pass (pedestrian traffic signal phase 724h) and all stop (pedestrian traffic signal phases 724c).

In some implementations of techniques provided by the present application, the phase of traffic signal can be determined according to the foresaid input of multiple vehicle position encodings, the pedestrian position encoding and the object speed encoding, and the phase can include vehicle traffic signal phases 723a-723i and pedestrian traffic signal phases 724a-724h. While the determination of the traffic signal phase, the relation between both vehicle traffic signal phases and pedestrian traffic signal phases can be considered. For example, upon determining that the pedestrian traffic signals 724 are all pass (such as the pedestrian traffic signal phase 724h), the vehicle traffic signals 723 can be all stop (such as the vehicle traffic signal phase 723i). For another example, upon determining that the vehicle traffic signals 723 are turning left in two ways (such as vehicle traffic signal phases 723c and 723d), the pedestrian traffic signals 724 can be all stop (such as the pedestrian traffic signal phase 724c). Similarly, in the case of FIG. 7B, when the vehicle traffic signals 723 are determined as straight forward and turning left in one way (such as the vehicle traffic signal phase 723e) according to the foresaid input of multiple encodings, the relation between vehicle traffic signal phases and pedestrian traffic signal phases can be considered to meanwhile determine that the pedestrian traffic signals 724 is pass on one side (such as the pedestrian traffic signal phase 724d).

Figure 8:
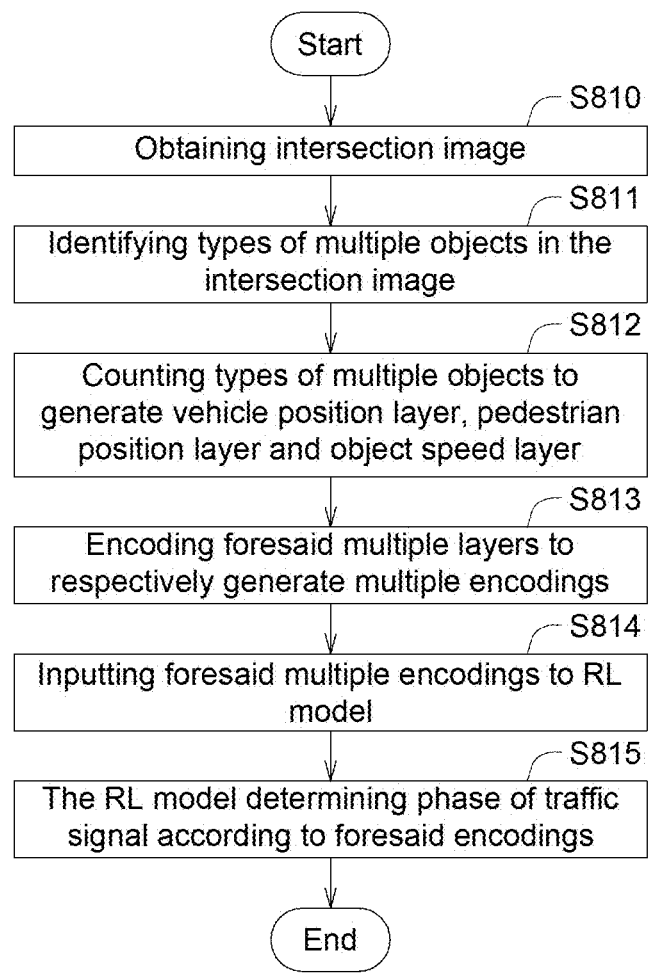
FIG. 8 is a flowchart of an example process (method) for controlling a traffic signal, according to one or more implementations of the present application.

FIG. 8 is a flowchart of an example process (method) 800 for controlling traffic signal, according to one or more implementations of the present application. In step S810, obtains, for example, by the image acquiring module 111, an intersection image (such as the intersection image 320b of FIG. 3). In step S811, identifies, for example, by the image analyze module 112 of FIG. 1, types of multiple objects (such as objects 322a-322c of FIG. 3) in the intersection image. In step S812, counts, for example, by the image analyze module 112 of FIG. 1, the types of the multiple objects, to generate a vehicle position layer, a pedestrian position layer and an object speed layer (such as layer 413a, layer 413b and layer 413c of FIGS. 4A to 4C, and layer 613d of FIG. 6). The object speed layer (such as the layer 613d of FIG. 6) corresponds to speeds of corresponded objects (such as objects 622d of FIG. 6) in the vehicle position layer (such as layer 413a and layer 413b of FIGS. 4A and 4B) and the pedestrian position layer (such as layer 413c of FIG. 4C). In step S813, encodes, for example, by the layer encoding module 113 of FIG. 1, the foresaid multiple layers (including the vehicle position layer, the pedestrian position layer and the object speed layer), to respectively generate multiple encodings (including a vehicle position encoding, a pedestrian position encoding and an object speed encoding). In step S814, inputs the foresaid multiple encodings (including the vehicle position encoding, the pedestrian position encoding and the object speed encoding) to a RL model (such as the RL model 114 of FIG. 1 or the RL model 214 of FIG. 2). In step S815, the RL model determines a phase of the traffic signal (such as vehicle traffic signal phases 723a-723i and pedestrian traffic signal phases 724a-724h) according to the foresaid multiple encodings (including the vehicle position encoding, the pedestrian position encoding and the object speed encoding).

Figure 9:
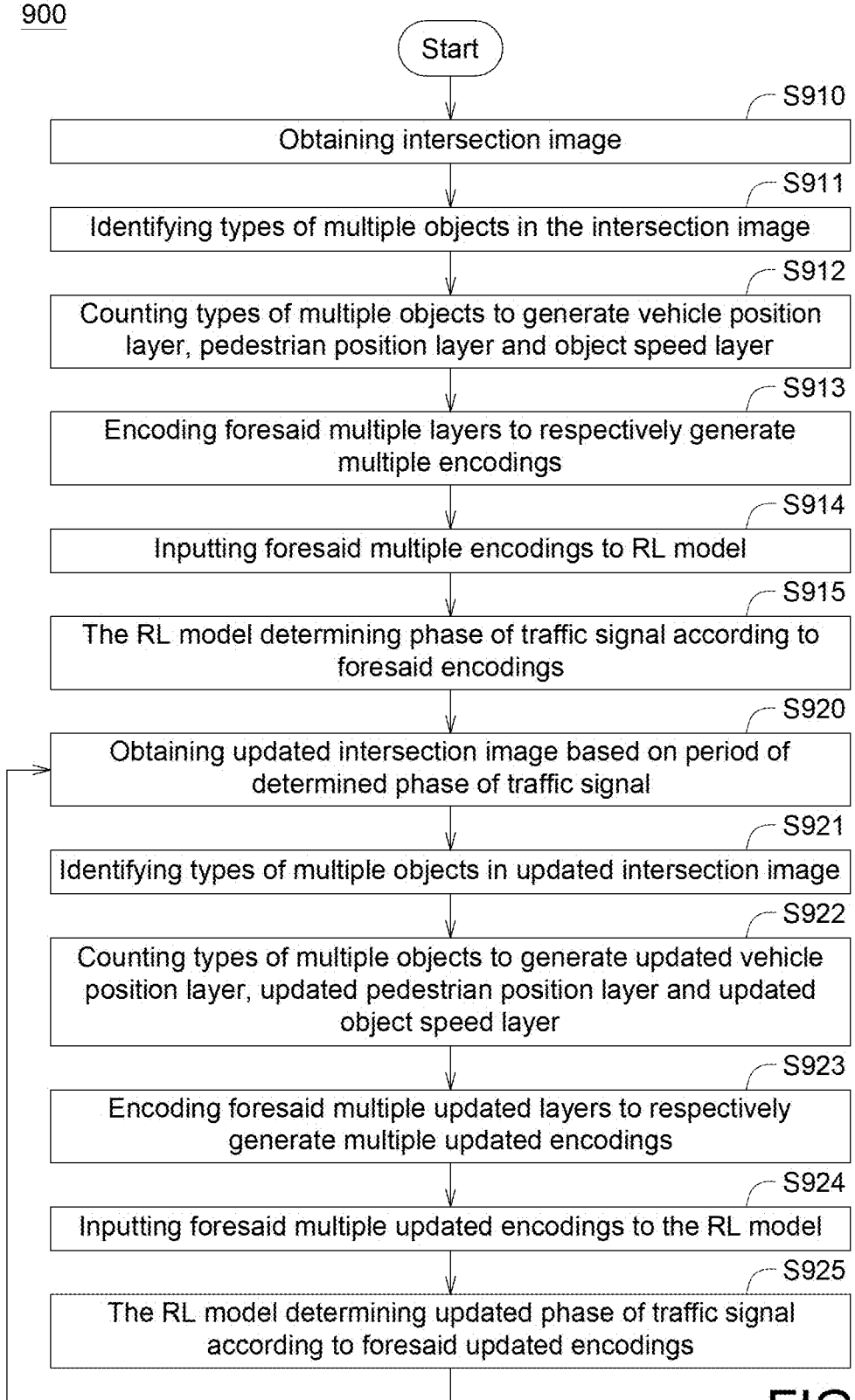
FIG. 9 is a flowchart of another example process (method) for controlling a traffic signal, according to one or more implementations of the present application.

FIG. 9 is a flowchart of another example process (method) 900 for controlling traffic signal, according to one or more implementations of the present application. The steps S910 to S915 are similar with the steps S810 to S815 of FIG. 8, which the descriptions for those steps are omitted here. The difference between FIG. 9 and FIG. 8 is that, after the RL model determining the phase of the traffic signal according to the foresaid multiple encodings (S915), obtains, for example, by the image acquiring module 111, an updated intersection image based on a period of the phase of the traffic signal being determined (S920). In step S921, identifies, for example, by the image analyze module 112 of FIG. 1, the types of the multiple objects (such as objects 322a-322c of FIG. 3) in the updated intersection image. In step S922, counts, for example, by the image analyze module 112 of FIG. 1, the types of the multiple objects, to generate an updated vehicle position layer, an updated pedestrian position layer and an updated object speed layer (such as layer 413a, layer 413b and layer 413c of FIGS. 4A to 4C, and layer 613d of FIG. 6). The updated object speed layer (such as the layer 613d of FIG. 6) corresponds to speeds of corresponded objects (such as object 622d of FIG. 6) in the updated vehicle position layer (such as layer 413a and layer 413b of FIGS. 4A and 4B) and the updated pedestrian position layer (such as layer 413c of FIG. 4C). In step S923, encodes, for example, by the layer encoding module 113 of FIG. 1, the foresaid multiple updated layers (including the updated vehicle position layer, the updated pedestrian position layer and the updated object speed layer), to respectively generate multiple updated encodings (including an updated vehicle position encoding, an updated pedestrian position encoding and an updated object speed encoding). In step S924, inputs the foresaid multiple updated encodings (including the updated vehicle position encoding, the updated pedestrian position encoding and the updated object speed encoding) to the RL model (such as the RL model 114 of FIG. 1 or the RL model 214 of FIG. 2). In step S925, the RL model determines an updated phase of the traffic signal (such as vehicle traffic signal phases 723a-723i and pedestrian traffic signal phases 724a-724h) according to the foresaid multiple updated encodings (including the updated vehicle position encoding, the updated pedestrian position encoding and the updated object speed encoding). After determining the updated phase of the traffic signal, it may process back to step S920 to repeat steps S920 to S925, which can keep determining following phases of the traffic signal based on each updated phase of the traffic signal corresponding to each updated intersection image of the intersection environment. Consequently by the time passing, the RL model can optimize itself according to the rewards, which can increase the accuracy and efficiency of controlling traffic.

Based on the techniques provided by the present disclosure as discussed above, the phase of traffic signal for vehicle or pedestrian can be determined by observing the actual status of vehicles and pedestrians (position and quantity status of vehicles and pedestrians) to optimize traffic conditions. Rewards can be provided according to effects of actions, which feed back to the RL model to keep observing the intersection environment based on the executed action, to facilitate adjusting future actions. Thus, the RL model is trained for how to control the phase of the traffic signal more effectively, which increases the ability of adapting various traffic conditions and the flexibility for dealing emergencies, and improves the safety due to the traffic management.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for controlling traffic signal, comprising:
obtaining an intersection image;
identifying types of a plurality of objects in the intersection image;
counting the types of the plurality of objects, to generate at least one vehicle position layer, a pedestrian position layer and an object speed layer, corresponding to the types of the plurality of objects, wherein the object speed layer corresponds to speeds of corresponded objects in the at least one vehicle position layer and the pedestrian position layer;
encoding the at least one vehicle position layer, the pedestrian position layer and the object speed layer, to respectively generate a vehicle position encoding, a pedestrian position encoding and an object speed encoding;
inputting the vehicle position encoding, the pedestrian position encoding and the object speed encoding to a reinforcement learning (RL) model; and
determining, by the RL model, a phase of the traffic signal according to the input of the vehicle position encoding, the pedestrian position encoding and the object speed encoding.

2. The method of claim 1, wherein the types of the plurality of objects identified in the intersection image, include large vehicles and small vehicles, and counting the types of the plurality of objects includes counting the large vehicles and the small vehicles, to respectively generate a large vehicle position layer and a small vehicle position layer of the at least one vehicle position layer.

3. The method of claim 2, wherein encoding the at least one vehicle position layer comprises encoding the large vehicle position layer and the small vehicle position layer are encoded, to respectively generate a large vehicle position encoding and a small vehicle position encoding,
wherein inputting the vehicle position encoding to the RL model comprises inputting the large vehicle position encoding and the small vehicle position encoding,
wherein the RL model determines a phase of the traffic signal according to the input of the large vehicle position encoding, the small vehicle position encoding, the pedestrian position encoding and the object speed encoding.

4. The method of claim 1, wherein counting the types of the plurality of objects to the object speed layer corresponding to the types of the plurality of objects comprises using a plurality of vectors for respectively representing positions and moving speeds of a plurality of corresponded moving objects in the intersection image.

5. The method of claim 1, wherein obtaining the intersection image comprises shooting a plurality of images by a plurality of camera units disposed on an intersection environment, and stitching the plurality of images to obtain the intersection image.

6. The method of claim 1, wherein obtaining the intersection image comprises shooting a panoramic image by a camera unit disposed on an intersection environment, and sectioning the intersection image from the panoramic image.

7. The method of claim 1, wherein identifying the types of the plurality of objects in the intersection image comprises, according to preset object areas, identifying the types of the plurality of objects from each object area, in the intersection image.

8. The method of claim 1, wherein encoding the at least one vehicle position layer and the pedestrian position layer is encoding based on a plurality of positions in the at least one vehicle position layer and the pedestrian position layer corresponding to the plurality of objects.

9. The method of claim 1, further comprising:
obtaining an updated intersection image based on a period of the phase of the traffic signal being determined;
identifying the types of the plurality of objects in the updated intersection image;
counting the types of the plurality of objects, to generate at least one updated vehicle position layer, an updated pedestrian position layer and an updated object speed layer, corresponding to the types of the plurality of objects, wherein the updated object speed layer corresponds to speeds of corresponded objects in the at least one updated vehicle position layer and the updated pedestrian position layer;
encoding the at least one updated vehicle position layer, the updated pedestrian position layer and the updated object speed layer, to respectively generate an updated vehicle position encoding, an updated pedestrian position encoding and an updated object speed encoding;
inputting the updated vehicle position encoding, the updated pedestrian position encoding and the updated object speed encoding to the RL model; and
determining, by the RL model, an updated phase of the traffic signal according to the input of the updated vehicle position encoding, the updated pedestrian position encoding and the updated object speed encoding.

10. The method of claim 9, wherein the phase and the updated phase of the traffic signal comprise a pedestrian traffic signal phase and a vehicle traffic signal phase.

11. A system for controlling traffic signal, comprising:
an image acquiring module, configured to obtain an intersection image;
an image analyze module, configured to identify types of a plurality of objects in the intersection image, and configured to count the types of the plurality of objects, to generate at least one vehicle position layer, a pedestrian position layer and an object speed layer, corresponding to the types of the plurality of objects, wherein the object speed layer corresponds to speeds of corresponded objects in the at least one vehicle position layer and the pedestrian position layer;
a layer encoding module, configured to encode the at least one vehicle position layer, the pedestrian position layer and the object speed layer, to respectively generate a vehicle position encoding, a pedestrian position encoding and an object speed encoding; and
a RL model, configured to receive the vehicle position encoding, the pedestrian position encoding and the object speed encoding, and configured to determine a phase of the traffic signal according to receiving of the vehicle position encoding, the pedestrian position encoding and the object speed encoding.

12. The system of claim 11, wherein the image analyze module identifies the types of the plurality of objects in the intersection image including large vehicles and small vehicles, and counts the large vehicles and the small vehicles in the intersection image, to respectively generate a large vehicle position layer and a small vehicle position layer of the at least one vehicle position layer.

13. The system of claim 12, wherein the layer encoding module encoding the at least one vehicle position layer, comprises encoding the large vehicle position layer and the small vehicle position layer are encoded, to respectively generate a large vehicle position encoding and a small vehicle position encoding,
wherein the RL model receiving the vehicle position encoding, comprises receiving the large vehicle position encoding and the small vehicle position encoding,
wherein the RL model determines a phase of the traffic signal according to receiving of the large vehicle position encoding, the small vehicle position encoding, the pedestrian position encoding and the object speed encoding.

14. The system of claim 11, wherein the image analyze module counting the types of the plurality of objects to the object speed layer corresponding to the types of the plurality of objects, comprises using a plurality of vectors for respectively representing positions and moving speeds of a plurality of corresponded moving objects in the intersection image.

15. The system of claim 11, wherein the image acquiring module obtaining the intersection image, comprises shooting a plurality of images by a plurality of camera units disposed on an intersection environment, and stitching the plurality of images to obtain the intersection image.

16. The system of claim 11, wherein the image acquiring module obtaining the intersection image, comprises shooting a panoramic image by a camera unit disposed on an intersection environment, and sectioning the intersection image from the panoramic image.

17. The system of claim 11, wherein the image analyze module identifying the types of the plurality of objects in the intersection image, comprises, according to preset object areas, identifying the types of the plurality of objects from each object area, in the intersection image.

18. The system of claim 11, wherein the layer encoding module encoding the at least one vehicle position layer and the pedestrian position layer is encoding based on a plurality of positions in the at least one vehicle position layer and the pedestrian position layer corresponding to the plurality of objects.

19. The system of claim 11, wherein the image acquiring module is configured to obtain an updated intersection image based on a period of the phase of the traffic signal being determined,
wherein the image analyze module is configured to identify the types of the plurality of objects in the updated intersection image, and is configured to count the types of the plurality of objects, to generate at least one updated vehicle position layer, an updated pedestrian position layer and an updated object speed layer, corresponding to the types of the plurality of objects, wherein the updated object speed layer corresponds to speeds of corresponded objects in the at least one updated vehicle position layer and the updated pedestrian position layer,
wherein the layer encoding module is configured to encode the at least one updated vehicle position layer, the updated pedestrian position layer and the updated object speed layer, to respectively generate an updated vehicle position encoding, an updated pedestrian position encoding and an updated object speed encoding,
wherein the RL model is configured to receive the updated vehicle position encoding, the updated pedestrian position encoding and the updated object speed encoding, and is configured to determine an updated phase of the traffic signal according to receiving of the updated vehicle position encoding, the updated pedestrian position encoding and the updated object speed encoding.

20. The method of claim 19, wherein the phase and the updated phase of the traffic signal determined by the RL model comprise a pedestrian traffic signal phase and a vehicle traffic signal phase.

* * * * *